(12) United States Patent
Solhusvik et al.

(10) Patent No.: US 9,667,895 B2
(45) Date of Patent: May 30, 2017

(54) STACKED CHIP SHARED PIXEL ARCHITECTURE

(71) Applicant: OMNIVISION TECHNOLOGIES, INC., Santa Clara, CA (US)

(72) Inventors: Johannes Solhusvik, Haslum (NO); Howard E. Rhodes, Nokomis, FL (US); Jie Shen, Fremont, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 68 days.

(21) Appl. No.: 14/707,572

(22) Filed: May 8, 2015

(65) Prior Publication Data

US 2016/0330392 A1  Nov. 10, 2016

(51) Int. Cl.
*H04N 5/374* (2011.01)
*H04N 5/3745* (2011.01)

(52) U.S. Cl.
CPC .............................. *H04N 5/37457* (2013.01)

(58) Field of Classification Search
CPC .. H04N 5/363; H04N 5/3765; H04N 5/35581; H04N 5/374; H04N 5/37452; H04N 5/3559; H04N 5/35572; H04N 5/3745; H04N 5/378; H04N 5/37457; H04N 5/3696

See application file for complete search history.

(56) References Cited

U.S. PATENT DOCUMENTS

| | | | | |
|---|---|---|---|---|
| 9,332,200 | B1* | 5/2016 | Hseih | H04N 5/363 |
| 2008/0284888 | A1* | 11/2008 | Kobayashi | H04N 5/374 |
| | | | | 348/308 |
| 2012/0205520 | A1* | 8/2012 | Hsieh | H01L 27/14605 |
| | | | | 250/208.1 |
| 2013/0068929 | A1 | 3/2013 | Solhusvik et al. | |
| 2013/0308027 | A1* | 11/2013 | Jenkin | H04N 5/347 |
| | | | | 348/302 |
| 2015/0041627 | A1* | 2/2015 | Webster | H01L 27/144 |
| | | | | 250/208.2 |

* cited by examiner

*Primary Examiner* — Roberto Velez
*Assistant Examiner* — Tuan Le
(74) *Attorney, Agent, or Firm* — Blakely Sokoloff Taylor & Zafman LLP

(57) ABSTRACT

An image sensor includes a pixel array disposed in a first semiconductor die. The pixel array is partitioned into a plurality of pixel sub-arrays. Each one of the plurality of pixel sub-arrays is arranged into a plurality of pixel groups. Each one of the plurality of pixel groups is arranged into a p×q array of pixel cells. A plurality of readout circuits is disposed in a second semiconductor die. An interconnect layer is stacked between the first semiconductor die and the second semiconductor die. The interconnect layer includes a plurality of conductors. Each one of the plurality of pixel sub-arrays is coupled to a corresponding one of the plurality of readout circuits through a corresponding one of the plurality of conductors.

12 Claims, 3 Drawing Sheets

STACKED CHIP SHARED PIXEL ARCHITECTURE

BACKGROUND INFORMATION

Field of the Disclosure

The present invention relates generally to imaging systems, and more particularly to CMOS image sensors in a stacked chip formation.

Background

Image sensors have become ubiquitous. They are widely used in digital still cameras, cellular phones, security cameras, as well as medical, automobile, and other applications. The technology used to manufacture image sensors, and in particular, complementary-metal-oxide-semiconductor (CMOS) image sensors, has continued to advance at great pace. For example, the demand of higher frame rates and lower power consumption has encouraged the further miniaturization and integration of these image sensors.

One way to increase the frame rate of a CMOS image sensor may be to increase the number of readout circuits operating in parallel. In conventional image sensors, one column of pixels in a pixel array may share one readout circuit. In other examples of the conventional art, one column of pixel cells in a pixel array may share a plurality of readout circuits. These solutions provide a higher frame rate, but require more silicon area, which is not be helpful in the miniaturization of silicon image sensors.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
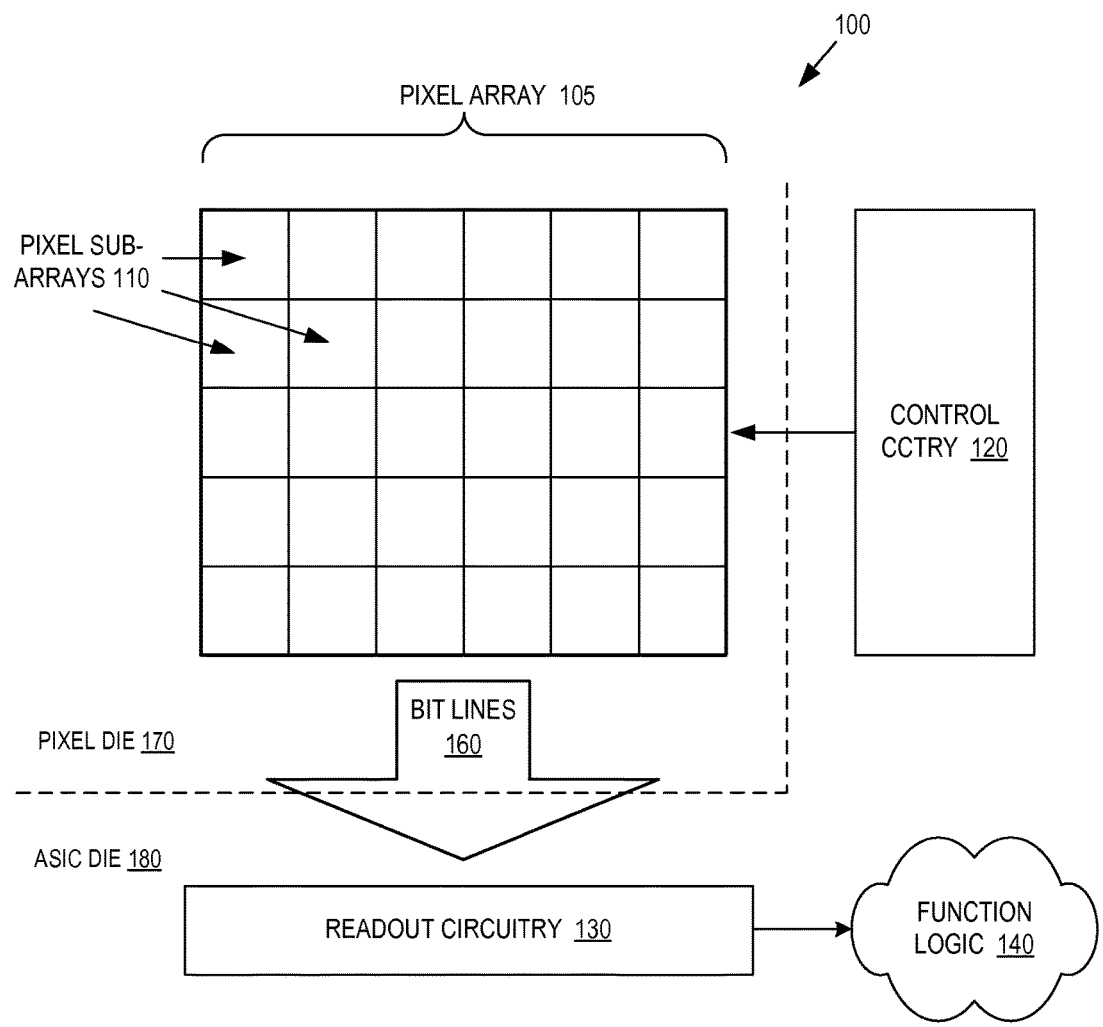
FIG. 1 is a block diagram illustrating one example of an imaging system that includes an image sensor having a pixel array with a plurality of pixels arranged in pixel sub-arrays with a pixel architecture for low power, fast readout in a stacked CMOS image sensor scheme in accordance with the teachings of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

Examples of an imaging system and method for reading out a plurality of pixel cells included in a plurality of pixel groups included in a plurality of pixel sub-arrays partitioned from a pixel array in a stacked CMOS image sensor are disclosed in accordance with the teachings of the present invention. In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

As will be disclosed in various examples, an effective method to read out a pixel array at high speed and/or low power utilizes pixel sub-arrays that are arranged in a stacked CMOS chip solution in which pixel cells are included in a first semiconductor die, and in which readout circuitry is included in a second semiconductor die. For instance, in one example, the first semiconductor die may be a pixel die, and the second semiconductor die may be an application specific integrated circuit (ASIC) die. In one example, the pixel sub-arrays may be made up of clusters of n×m pixel groups. In the example, the amplifier output nodes of the pixel cells inside the n×m pixel groups are coupled together such that each one of the n×m pixel groups share a single readout circuit included in readout circuitry in accordance with the teachings of the present invention. In the example, the pixel sub-arrays are read out in parallel at high speed and/or with low power in accordance with the teachings of the present invention.

To illustrate, FIG. 1 is a block diagram illustrating an example imaging system 100 that includes an image sensor having a pixel array 105 partitioned into a plurality of pixel sub-arrays including a pixel architecture for low power, fast readout in a stacked image sensor scheme in accordance with the teachings of the present invention. In the illustrated example, imaging system 100 is realized with stacked CMOS chips, which include a pixel die 170 stacked with and coupled to an ASIC die 180. For instance, in one example, pixel die 170 includes a pixel array 105, and ASIC die 180 includes control circuitry 120, readout circuitry 130, and function logic 140. In the depicted example, control circuitry 120 is coupled to control operation of pixel array 105, which is coupled to be read out by readout circuitry 130 through bitlines 160.

In particular, in the example depicted in FIG. 1, pixel array 105 is a two-dimensional (2D) array that is partitioned into a plurality of pixel sub-arrays 110 as shown. In one example, each pixel sub-array 110 includes a plurality of pixel groups, each of which includes a plurality of pixel cells (not shown in FIG. 1). In the example, each one of the plurality of pixel groups in a pixel sub-array is coupled to utilize the same bit line of bit lines 160, and share the same readout circuit in readout circuitry 130, more details of which will be described below in connection with FIG. 2.

Control circuitry 120 is coupled to pixel array 105 to control the operational characteristics of pixel array 105. In one example, control circuitry 120 is coupled to generate a global shutter signal for controlling image acquisition for each pixel cell. In the example, the global shutter signal simultaneously enables particular pixel cells within all pixel sub-arrays 110 of pixel array 105 to simultaneously transfer the image charge from their respective photodetector during a single acquisition window.

In one example, after each of the pixel cells in a pixel sub-array 110 has acquired its image data or image charge, the image data is read out by readout circuitry 130 through a bit line of bit lines 160. In various examples, readout circuitry 130 may include amplification circuitry, analog-to-digital conversion (ADC) circuitry or otherwise. Function logic 140 may simply store the image data or even manipulate the image data by applying post image effects (e.g. crop, rotate, remove red eye, adjust brightness, adjust contrast, or otherwise).

Figure 2:
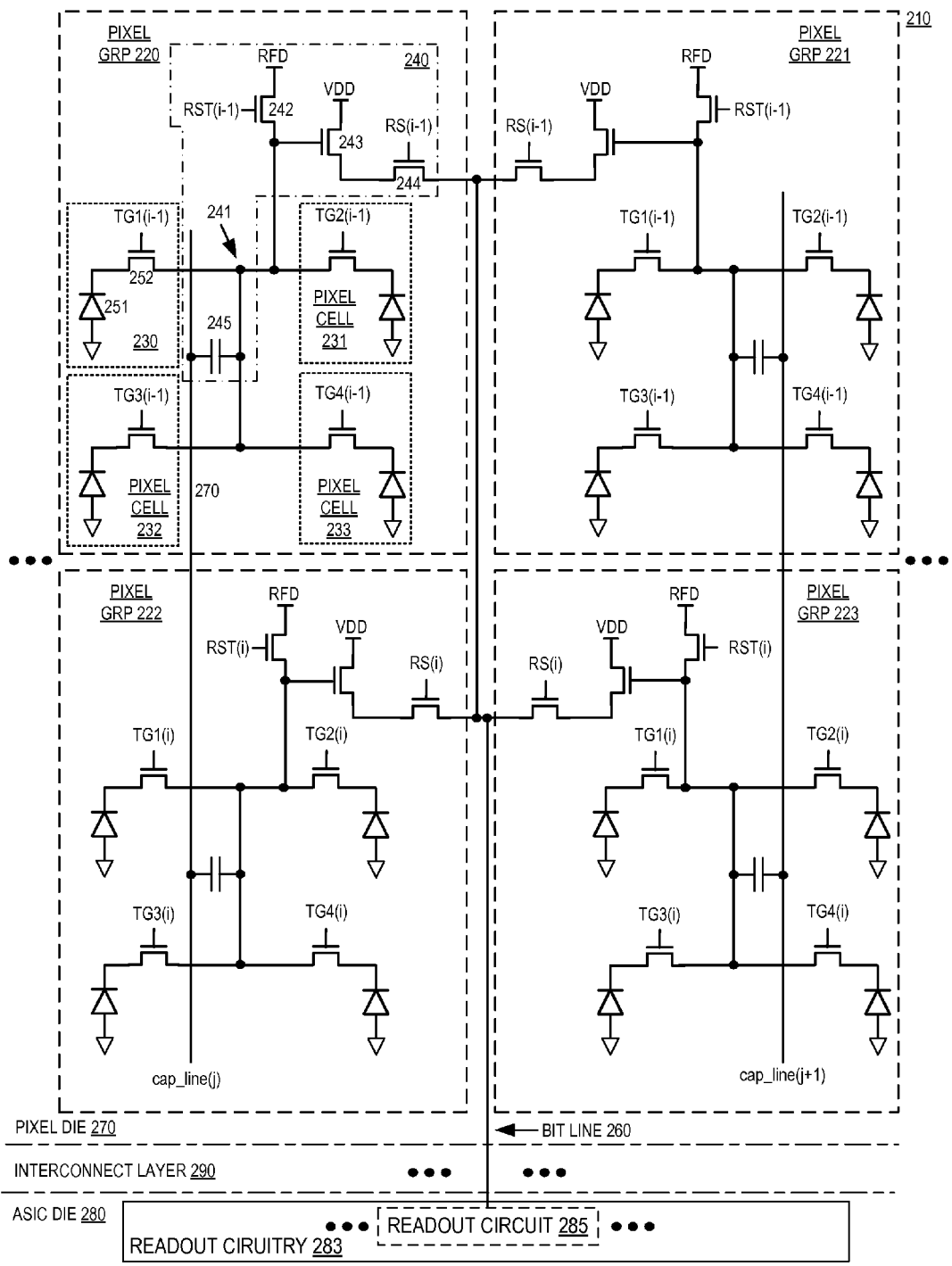
FIG. 2 is a schematic of a portion of an image sensor including an example pixel sub-array included in a pixel array in accordance with the teachings of the present invention.

FIG. 2 is a schematic of one example of a portion of an image sensor including a pixel sub-array 210, which may be one of a plurality of pixel sub-arrays included in a pixel array, such as for example pixel array 105 of FIG. 1, in accordance with the teachings of the present invention. In the example depicted in FIG. 2, pixel sub-array 210 includes a plurality of pixel groups 220, 221, 222, and 223 that arranged into n=2 columns and m=2 rows. Each of the four pixel groups 220, 221, 222, and 223 that make up pixel sub-array 210 in the example depicted in FIG. 2 includes four pixel cells 230, 231, 232 and 233 arranged into p=2 columns and q=2 rows, and pixel support circuitry 240 that is shared by all four pixel cells 230, 231, 232 and 233, of each pixel group 220, 221, 222, and 223.

The pixel cell is the smallest repeating unit in pixel array 105 of FIG. 1, and each of the pixel cells 230, 231, 232, and 233 shown in the example illustrated in FIG. 2 includes a photodetector 251 and transfer transistor 252, which is coupled to be controlled by a transfer signal TG. Transfer transistors arranged in the same row in pixel array 105, and in the same position within a respective pixel group may be controlled by the same transfer signal. For example, transfer transistor 252 of pixel cell 230, arranged in the upper left corner of pixel group 220 is controlled by transfer signal TG1(i−1), and the corresponding pixel cell in pixel group 221 that is arranged in the same row as pixel cell 230 in pixel group 220, also includes a transfer transistor that is controlled by transfer signal TG1(i−1) as shown.

Each of the four transfer transistors 252 in pixel cells 230, 231, 232, and 233 of a particular pixel group, such as pixel group 220, shares a single floating diffusion node 241. Each of the pixel support circuitry 240 shown in the illustrated example is coupled to and is shared by the four transfer transistors 252 in pixel cells 230, 231, 232, and 233 of each particular pixel group, and includes a reset transistor 242, an amplifier transistor 243, which in the illustrated example is a source follower (SF) coupled transistor 243, a row select transistor 244, and a capacitor 245, which is coupled to a capacitor line 270. Floating diffusion node 241 is coupled to be reset to a floating diffusion reset voltage via power supply RFD through a reset transistor 242. Reset transistor 242 is coupled to be controlled in response to a reset signal RST. In the example, pixel groups that are arranged in the same row are controlled by the same reset signal. For instance, pixel groups 220 and 221 are controlled by reset signal RST(i−1), while pixel groups 222 and 223 are controlled by reset signal RST(i).

Floating diffusion node 241 is also coupled to the control terminal of an amplifier transistor, which in FIG. 2 is the source follower transistor 243 having its gate terminal coupled to floating diffusion node 241, and drain terminal coupled to power supply VDD. In the depicted example, row select transistor 244 is controlled by a row select signal. In the example, pixel groups that are arranged in the same row are controlled by the same row select signal RS. For instance, pixel groups 220 and 221 are controlled by row select signal RS(i−1), while pixel groups 222 and 223 are controlled by row select signal RS(i). In one example, row select transistor 244 is coupled between bit line 260 and the drain terminal of source follower transistor 243. The source terminal of source follower transistor 243 is coupled to bit line 260. Pixel cells in the same pixel sub-array are coupled to the same bit line.

Capacitor 245 is coupled between floating diffusion 241 and capacitor line 270. In the depicted example, capacitor line 270 coupled to pixel groups 220 and 222 is coupled to receive a signal cap_line(j). Capacitor 245 may increase the capacitance of floating diffusion node 241 to increase the dynamic range of a pixel cell in response to cap_line(j). In the illustrated example, capacitor 245 of each pixel group 220, 221, 222, and 223 may be used to disable other pixel groups when a certain pixel group is being read. For instance, pixel groups 220 and 222 may be disabled during the read out of pixel groups 221 and 223 by applying a low voltage to capacitor line 270 in response to cap_line(j). Similarly, pixel groups 221 and 223 may be disabled during the read out of pixel groups 220 and 222 by applying a low voltage via cap_line(j+1).

In other examples, it is appreciated that capacitor 245 and capacitor line 270 may be omitted, and pixel groups that contain pixels cells that are not being read out may be disabled by applying a low voltage to RFD. In other examples, pixel groups which contain pixel cells that are not being read out may be disabled by coupling a pull down transistor between floating diffusion 241 and a low voltage such as ground, and enabling the pull down transistor to provide the low voltage to floating diffusion 241.

As summarized above, it is noted that in the example depicted in FIG. 2 that pixel sub-array 210 includes a plurality of pixel groups arranged in an n×m array, where n=2 and m=2. In addition, it is noted that each pixel group includes a plurality of pixel cells arranged in a p×q array, where p=2 and q=2, and where the pixel cells in each pixel group all share the same pixel support circuitry 240. It is appreciated of course that the illustrated example utilizes n=2, m=2, p=2, and q=2, for explanation purposes, and that in other examples, other values may be utilized for n, m, p, and q, where n>1, m>1, p>1, and q>1, and where n, m, p, and q are integers.

As illustrated in the depicted example, all of the pixel cells of pixel sub-array 210, are formed on a pixel die 270, and share the same bit line 260. In one example, bit line 260 may couple all of the pixel cells of pixel sub-array 210 to a single readout circuit 285, which may be included as one of a plurality of readout circuits included in readout circuitry 283 formed on an ASIC die 280 that is stacked with and coupled to pixel die 270. In one example, each single readout circuit 285 of the plurality of readout circuits included in readout circuitry 283 is coupled to a single one of the plurality of pixel sub arrays through a single bit line 260. In one example, an interconnect layer 290 is disposed between the pixel die 270 and ASIC die 280. In one example, interconnect layer 290 may include a plurality of conductors. In example, each one of the plurality of conductors may be utilized to couple the readout circuitry 283 to the circuitry included in pixel die 270.

For instance, in the example depicted in FIG. 2, bit line 260 is realized using one of the plurality of conductors that are included in interconnect layer 290. In other words, in one example, each single one of the plurality of pixel sub-arrays (e.g., pixel sub-array 210) in pixel die 270 may be coupled to a corresponding single one of a plurality of readout circuits (e.g., readout circuit 285) included in readout circuitry 283 in ASIC die 280 through a corresponding single one of the plurality of conductors (e.g., bit line 260) included in interconnect layer 290. As such, in one example, each single one of the plurality of pixel sub arrays may be read out in parallel by a corresponding single one of the plurality of readout circuits through a corresponding single one of the plurality of conductors, or single bit line, in accordance with the teachings of the present invention.

In one example, the interconnect layer 290 may include vias such as micro-through silicon vias (µTSVs) or through silicon vias (TSVs). In other examples, one pixel sub-array 210 may be coupled to more than one readout circuit 285 formed on ASIC die 280. In yet other examples, two or more pixel sub-arrays 210 may share one readout circuit 285 formed on an ASIC die 280. In one example, each of the plurality of readout circuits 285 may include analog-to-digital converter (ADC) circuits, adders, and memory, such as static random access memory (SRAM) or dynamic random access memory (DRAM), that are formed on ASIC die 280. In still other examples, each of the plurality of readout circuits 285 may include ADC circuits and adders formed on an ASIC die 280, with memory such as SRAM and DRAM formed on a memory die, which may be coupled to ASIC die 280 through an interconnect layer.

Figure 3:
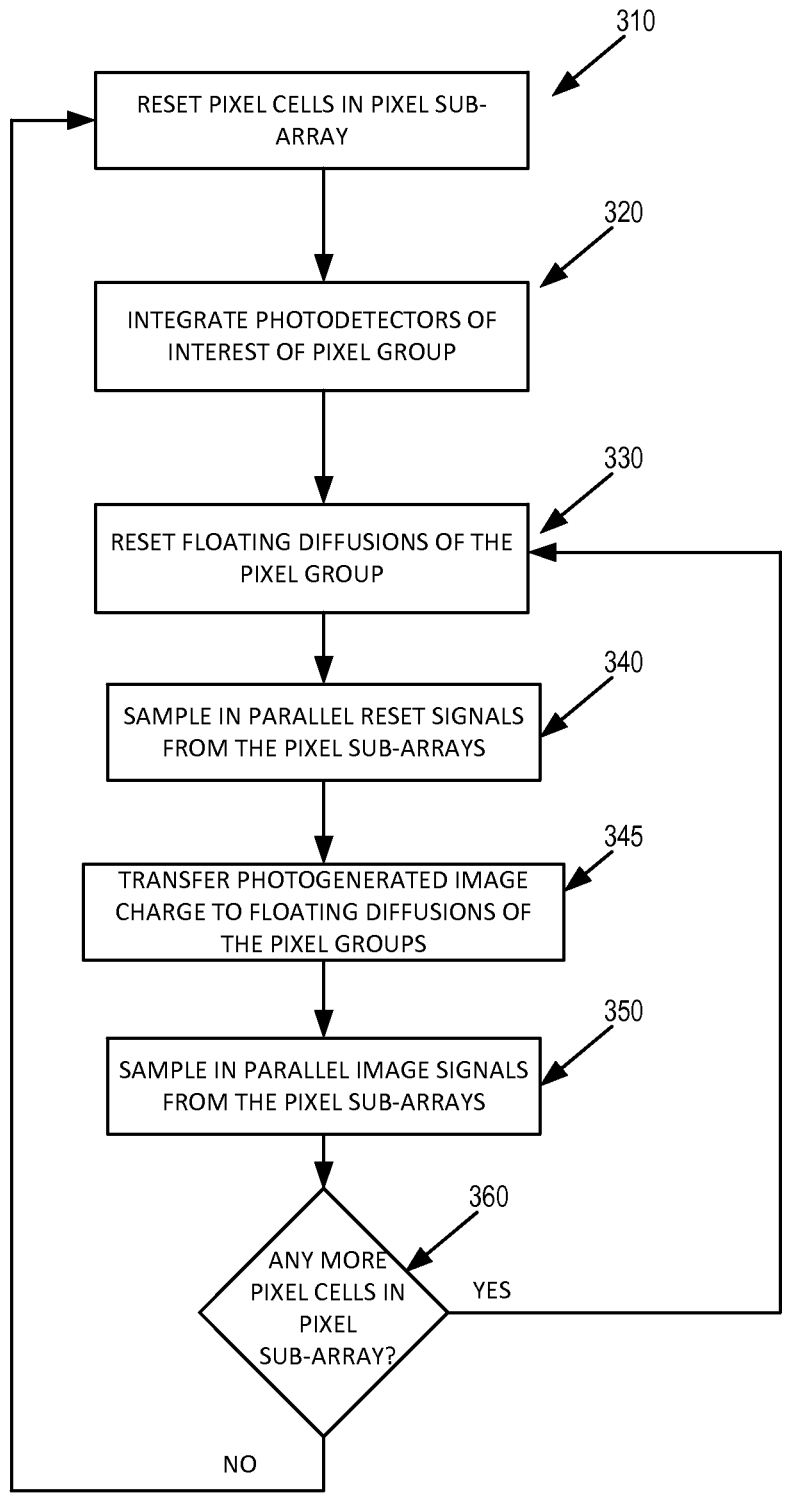
FIG. 3 is a flow chart showing an example process for reading out a pixel array partitioned into pixel sub-arrays in accordance with the teachings of the present invention.

FIG. 3 is a flow chart showing an example process for reading out pixel sub-arrays partitioned from a pixel array of an image sensor in parallel in accordance with the teachings of the present invention. In the depicted example, it is appreciated that the process may be applied for example to the pixel sub-arrays as described in above with respect to FIG. 1 and/or FIG. 2. For instance, as described above, each pixel sub-array includes a plurality of pixel groups, each of which includes a plurality of pixel cells as discussed in detail above with respect FIG. 1 and/or FIG. 2. For instance, during a readout period, one pixel cell per pixel sub-array 110 of pixel array 105 from FIG. 1 is selected at a time, and pixel sub-arrays 110 are read out in parallel with other pixel sub-arrays of the pixel array in accordance with the teachings of the present invention.

To illustrate, in process block 310 of FIG. 3, pixel cells in each pixel sub-array 110 are reset. In one example, the pixel cells are reset by asserting the respective reset signals RST and transfer signals TG. In the example, both the reset signals RST and transfer signals TG are de-asserted after the pixel cells of interest of pixel sub-array 110 are reset.

In process block 320, the photodetectors of interest of pixel sub-array 110 are integrated. During this time, charge carriers are photogenerated in the photodetectors of interest in response to incident light on the photodetector.

In process block 330, the single floating diffusion node in each of the pixel groups associated with the pixel cell of interest is reset by asserting the associated reset signal RST to turn on the reset transistor of the pixel group. After the floating diffusion is reset, the reset signal RST is de-asserted.

In process block 340, the reset signal from the floating diffusion node of the pixel group of interest from the pixel sub-array is sampled in parallel with reset signals from other pixel sub-arrays by asserting the associated row select signal RG of the pixel groups of interest, and in some examples by asserting and/or de-asserting the cap_lines of other pixel groups as needed. In one example, it is appreciated that the reset signal of each pixel sub-array is sampled in parallel with other reset signals from other pixel sub-arrays of the image sensor in accordance with the teachings of the present invention. The associated row select signal RG is de-asserted after reset signal is sampled.

In process block 345, the photogenerated charge carriers in the photodetector of interest are transferred to the associated floating diffusion node of the pixel group of interest when the associated transfer signal TG of the pixel group of interest is asserted. The transfer signal TG is de-asserted after the charge carriers of pixel cell of interest of pixel sub-array 110 have been transferred to the floating diffusion node and sampled.

In process block 350, the image signal from the floating diffusion node of the pixel group of interest from the pixel sub-array is sampled in parallel with image signals from other pixel sub-arrays by asserting associated row select signal RG of the pixel group of interest, and in some examples by asserting and/or de-asserting the cap_lines of other pixel groups as needed. In one example, it is appreciated that the image signal of each pixel sub-array is sampled in parallel with other image signals from other pixel sub-arrays of the image sensor in accordance with the teachings of the present invention. The associated row select signal RG is de-asserted after image signal is sampled.

In decision block 360, if there are more pixel cells in the pixel sub-array that have not yet been read out, then processing loops back to process block 330, where the single floating diffusion node in each of the pixel groups associated with the pixel cell of interest is reset as shown.

If it is determined in decision block 360 that all the pixel cells of the pixel sub-array have been read out, then processing loops back to process block 310, where all of the pixel cells of pixel sub-array 110 are reset as shown. In one example, a decision block may determine if a subset of the pixel cells in the pixel sub-array have been read out, and if it has, then all of the subset of the pixel cells in the pixel sub-array 110 are reset.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. An image sensor, comprising:
   a pixel array disposed in a first semiconductor die, wherein the pixel array is partitioned into a plurality of pixel sub-arrays, wherein each one of the plurality of pixel sub-arrays is arranged into a plurality of pixel groups, wherein each one of the plurality of pixel groups is arranged into a p×q array of pixel cells, wherein each one of the plurality of pixel groups includes pixel support circuitry coupled to and shared by the p×q array of pixel cells included in said each one of the plurality of pixel groups, wherein each one of the pixel cells in the p×q array of pixel cells includes a photodetector coupled to the pixel support circuitry through a transfer transistor, wherein the pixel support circuitry comprises:
- a floating diffusion node coupled to the transfer transistor of each one of the pixel cells; and
- a capacitor coupled between the floating diffusion node and a capacitor line, wherein the capacitor is coupled to receive a capacitor line signal through the capacitor line, wherein said each one of the pixel groups is coupled to be disabled in response to the capacitor line signal received through the capacitor signal line;

a plurality of readout circuits disposed in a second semiconductor die; and an interconnect layer stacked between the first semiconductor die and the second semiconductor die, wherein the interconnect layer includes a plurality of conductors, and wherein each one of the plurality of pixel sub-arrays is coupled to a corresponding one of the plurality of readout circuits through a corresponding one of the plurality of conductors.

2. The image sensor of claim 1 wherein p and q are integers greater than 1.

3. The image sensor of claim 1 wherein each one of the plurality of pixel sub-arrays is arranged into a plurality of n×m pixel groups.

4. The image sensor of claim 3 wherein n and m are integers greater than 1.

5. The image sensor of claim 1 wherein the pixel support circuitry further comprises:
- an amplifier transistor coupled to the floating diffusion node;
- a row select transistor coupled between a bit line and the amplifier transistor; and
- a reset transistor coupled between the floating diffusion node and a reset voltage.

6. The image sensor of claim 5 wherein said bit line is further coupled to said corresponding one of the plurality of conductors such that each one of the plurality of pixel sub-arrays is coupled to the corresponding one of the plurality of readout circuits through said bit line.

7. An imaging system, comprising:
- a pixel array disposed in a first semiconductor die, wherein the pixel array is partitioned into a plurality of pixel sub-arrays, wherein each one of the plurality of pixel sub-arrays is arranged into a plurality of pixel groups, wherein each one of the plurality of pixel groups is arranged into a p×q array of pixel cells, wherein each one of the plurality of pixel groups includes pixel support circuitry coupled to and shared by the p×q array of pixel cells included in said each one of the plurality of pixel groups, wherein the pixel support circuitry comprises:
  - a floating diffusion node coupled to each one of the pixel cells in the p×q array of pixel cells, wherein each one of the pixel cells in the p×q array of pixel cells includes a photodetector coupled to the pixel support circuitry through a transfer transistor; and
  - a capacitor coupled between the floating diffusion node and a capacitor line, wherein the capacitor is coupled to receive a capacitor line signal through the capacitor line, wherein said each one of the pixel groups is coupled to be disabled in response to the capacitor line signal received through the capacitor signal line;
- a plurality of readout circuits included in readout circuitry disposed in a second semiconductor die, wherein each one of the plurality of pixel sub-arrays is coupled to a corresponding one of the plurality of readout circuits through a corresponding one of a plurality of conductors; and
- control circuitry disposed in the second semiconductor die coupled to the pixel array to control operation of the pixel array, wherein the control circuitry is disposed in the second semiconductor die.

8. The imaging system of claim 7 further comprising an interconnect layer stacked between the first semiconductor die and the second semiconductor die, wherein the plurality of conductors are included in the interconnect layer.

9. The imaging system of claim 7 further comprising function logic coupled to the readout circuitry to store the image data readout from the pixel array, wherein the function logic is disposed in the second semiconductor die.

10. The imaging system of claim 7 wherein each one of the plurality of pixel sub-arrays is arranged into a plurality of n×m pixel groups.

11. The imaging system of claim 10 wherein n, m, p, and q are integers greater than 1.

12. The imaging system of claim 7 wherein the pixel support circuitry further comprises:
- an amplifier transistor coupled to the floating diffusion node;
- a row select transistor coupled between a bit line coupled to the readout circuitry, and the amplifier transistor; and
- a reset transistor coupled between the floating diffusion node and a reset voltage.

* * * * *